US012680935B2

(12) United States Patent
Chokyu et al.

(10) Patent No.: US 12,680,935 B2
(45) Date of Patent: Jul. 14, 2026

(54) METHOD FOR DETERMINING GOOD-QUALITY PRODUCT OF ELECTRODE INK

(71) Applicant: HONDA MOTOR CO., LTD., Tokyo (JP)

(72) Inventors: Shinsuke Chokyu, Tokyo (JP); Kazutoshi Mameda, Tokyo (JP); Nobuyoshi Muromoto, Tokyo (JP); Tsuyoshi Kokusho, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 462 days.

(21) Appl. No.: 18/281,017

(22) PCT Filed: Mar. 12, 2021

(86) PCT No.: PCT/JP2021/010050
§ 371 (c)(1),
(2) Date: Sep. 8, 2023

(87) PCT Pub. No.: WO2022/190355
PCT Pub. Date: Sep. 15, 2022

(65) Prior Publication Data
US 2024/0159637 A1      May 16, 2024

(51) Int. Cl.
*G01N 11/14* (2006.01)
*H01M 4/88* (2006.01)

(52) U.S. Cl.
CPC ............. *G01N 11/142* (2013.01); *H01M 4/88* (2013.01)

(58) Field of Classification Search
CPC ........ H01M 4/88; H01M 4/86; H01M 4/8828; G01N 11/14; G01N 11/142
See application file for complete search history.

(56) References Cited

U.S. PATENT DOCUMENTS

2014/0205932 A1      7/2014  Hori et al.
2020/0083551 A1      3/2020  Salomon et al.

FOREIGN PATENT DOCUMENTS

CN      103782429 A      5/2014
CN      110896146 A      3/2020
JP      2002-168750 A      6/2002
JP      2009-181745 A      8/2009
JP      2013-072679 A      4/2013

(Continued)

OTHER PUBLICATIONS

PCT/ISA/210 from International Application PCT/JP2021/010050 with the English translation thereof.

(Continued)

*Primary Examiner* — Sarah A. Slifka

(74) *Attorney, Agent, or Firm* — Carrier, Shende & Associates P.C.; Joseph P. Carrier; Fulchand P. Shende

(57) ABSTRACT

According to the present invention, in an electrode ink, ionomers are adsorbed around a catalyst carrier to form a primary aggregate which does not aggregate with another catalyst carrier, and catalyst carriers aggregate together to form a secondary aggregate. In this method for determining a good-quality product of an electrode ink, the modulus of elasticity of the electrode ink is detected. Furthermore, on the basis of the modulus of elasticity, the states of the primary aggregate and the secondary aggregate in the electrode ink are estimated, and, if the contained amount of the primary aggregate is greater than that of the secondary aggregate, the electrode ink is determined to be good-quality.

3 Claims, 5 Drawing Sheets

(56)        References Cited

FOREIGN PATENT DOCUMENTS

| JP | 2014-167402 | A | 9/2014 |
| JP | 2014-212017 | A | 11/2014 |
| JP | 2018-133277 | A | 8/2018 |
| JP | 2018-152333 | A | 9/2018 |

OTHER PUBLICATIONS

Office Action and Search Report dated Apr. 22, 2026 in corresponding Chinese Application No. 202180095608.5.

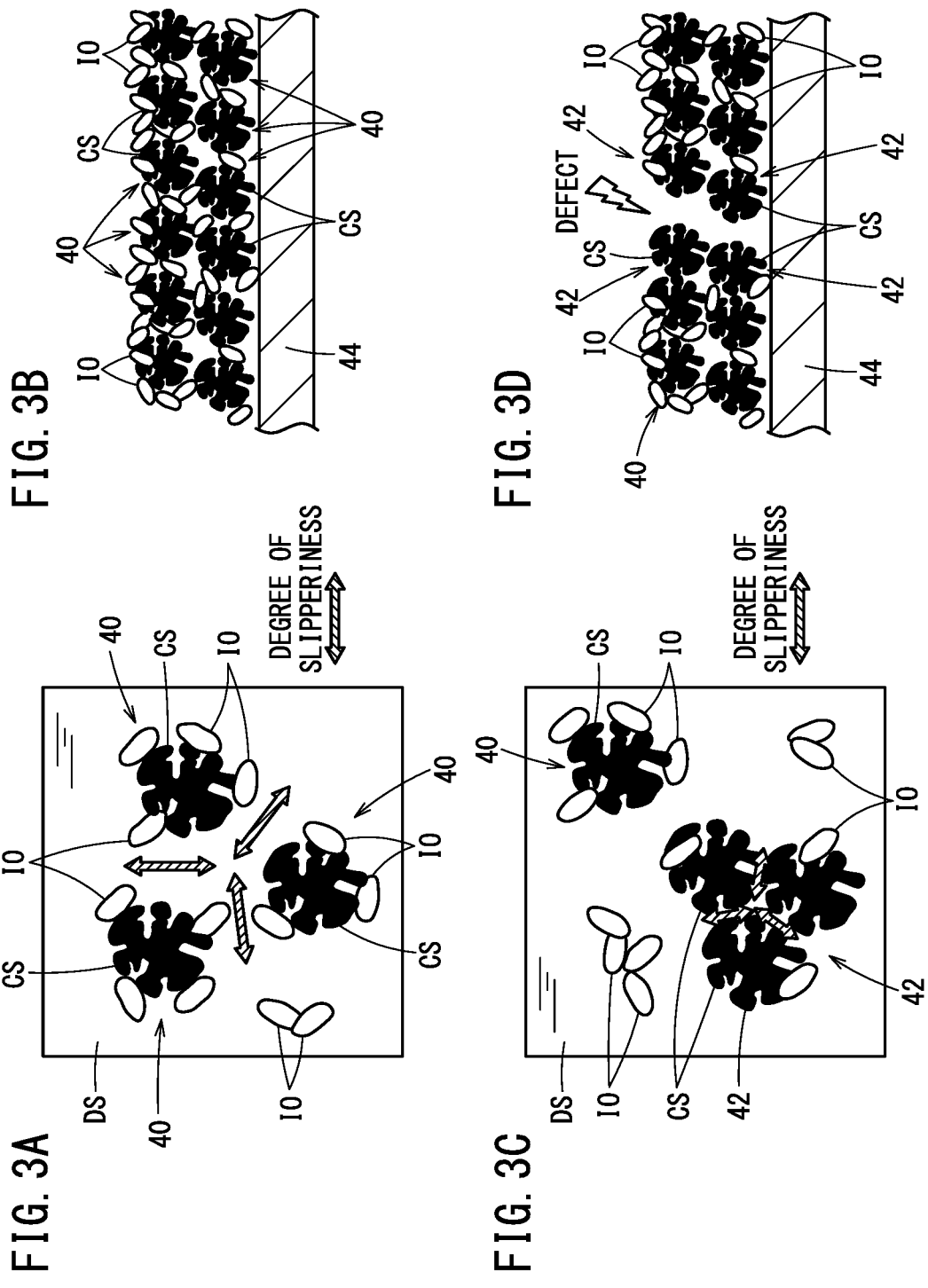

METHOD FOR DETERMINING GOOD-QUALITY PRODUCT OF ELECTRODE INK

TECHNICAL FIELD

The present invention relates to a method of determining a good quality (method for determining a good-quality product) of an electrode ink for forming the electrodes of a fuel cell.

BACKGROUND ART

In JP 2014-212017 A, a technique is disclosed of forming a catalyst layer for a fuel cell by coating an electrode ink (a catalyst ink) in which catalyst-carrying carbon (catalyst supports) and ionomers are mixed. Within this type of electrode ink, by the ionomers being uniformly present in a dispersive solvent, and being adsorbed around the catalyst supports, a large amount of primary aggregate becomes included therein. Conversely, by the ionomers existing non-uniformly within the dispersive solvent and being not adsorbed around the catalyst supports, within the electrode ink, a large amount of secondary aggregate in which the catalyst supports themselves are aggregated becomes included therein, and in accordance therewith, the amount of the primary aggregate becomes less plentiful.

When a large amount of the secondary aggregate is present in the electrode ink, defects (cracks and the like) occur on a dry coated surface after the electrode ink has been coated thereon, and the power generating area of the fuel cell narrows. In manufacturing of the fuel cells, the disposal of electrodes in which defects have occurred significantly reduces the yield at the time of manufacturing.

In this instance, as a method of evaluating the ink prior to coating thereof, as disclosed in JP 2014-167402 A, a viscosity distribution (the viscosity at a plurality of locations) of the ink which is stored in a container is measured to thereby carry out an evaluation of a state of sedimentation thereof. However, even with such an evaluation method, there is a possibility that the primary aggregate and the secondary aggregate may be uniformly distributed within the electrode ink, and it is not possible to capture a difference in the generation of the secondary aggregate (the amount of the primary aggregate and the amount of the secondary aggregate) within the electrode ink. More specifically, conventionally, it has not been possible to sufficiently determine if the electrode ink is of good quality or not prior to coating of the electrode ink.

SUMMARY OF THE INVENTION

In view of the situation described above, the present invention has the object of providing a method of determining a good quality of an electrode ink which is capable of suitably determining a goodness or badness of the electrode ink prior to coating of the electrode ink, and in accordance therewith, suppressing the occurrence of defects on a dried surface after having been coated with the electrode ink.

In order to achieve the aforementioned object, a first aspect of the present invention is characterized by a method of determining a good quality of an electrode ink configured to include a plurality of catalyst supports and a plurality of ionomers, and configured to form a catalyst layer of a fuel cell, wherein, in an inner portion of the electrode ink, by adsorption of the ionomers around the catalyst supports, a primary aggregate that does not aggregate with others of the catalyst supports is formed, while on the other hand, by aggregation of the catalyst supports themselves without the ionomers around the catalyst supports, a secondary aggregate is formed, the method of determining a good quality of an electrode ink comprising the steps of detecting elastic modulus of the electrode ink, and based on the detected elastic modulus, estimating a state of the primary aggregate and the secondary aggregate within the electrode ink, and as the primary aggregate becomes more plentifully contained within the electrode ink relative to the secondary aggregate, the more it is determined that the electrode ink is a good quality product.

In the above-described method of determining a good quality of an electrode ink, it is possible to suitably determine a goodness or badness of the electrode ink prior to coating of the electrode ink, and in accordance therewith, to suppress the occurrence of defects on a dried surface after having been coated with the electrode ink.

BRIEF DESCRIPTION OF DRAWINGS

FIG. 3A is an explanatory diagram showing the formation of a primary aggregate of the electrode ink; FIG. 3B is an explanatory diagram showing a dry coated surface after the electrode ink having a large amount of the primary aggregate has been coated thereon; FIG. 3C is an explanatory diagram showing the formation of a secondary aggregate of the electrode ink; FIG. 3D is an explanatory diagram showing a dry coated surface after the electrode ink having a large amount of the secondary aggregate has been coated thereon;

DESCRIPTION OF THE PREFERRED EMBODIMENTS

Hereinafter, a description of a preferred embodiment of the present invention will be presented and described in detail below with reference to the accompanying drawings.

Figure 1:
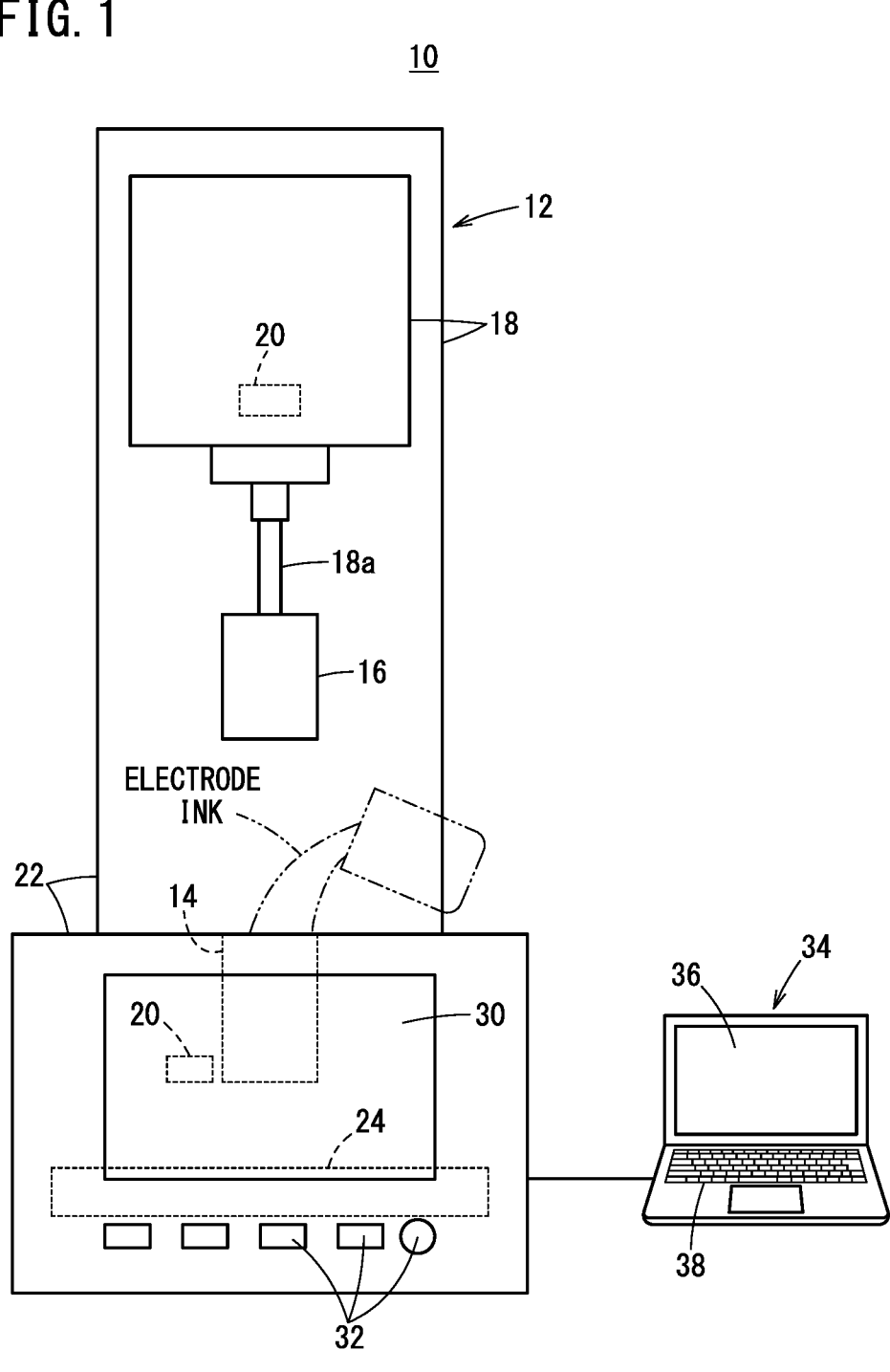
FIG. 1 is a side view showing the overall configuration of a measurement system that carries out a method of determining a good quality of an electrode ink according to an embodiment of the present invention.

As shown in FIG. 1, a method of determining a good quality of an electrode ink according to an embodiment of the present invention utilizes a measurement system 10 for measuring a sample of the electrode ink that forms a catalyst layer of a fuel cell, and thereby determines whether the electrode ink is of good quality (a good quality product or a defective product).

The electrode ink, for example, is a catalyst ink for a fuel cell electrode that contains catalyst supports CS on which a catalyst is supported, ionomers IO possessing proton conductivity (an electrolyte polymer, an electrolyte solution), and a dispersive solvent DS in which the catalyst supports CS and the ionomers IO are dispersed. As the catalyst supports CS, there can be applied ceramic or conductive carbon (including carbon fibers) on which platinum (Pt) particles are supported. The ionomers IO are ones in which a part of a hydrophobic main chain is replaced by a hydrophilic ionic group (a salt of carboxylic acid, sulfonic acid, or the like) and there can be applied as the ionomers IO a fluorine-based electrolytic polymer such as a perfluorosulfonic acid polymer or a non-fluorine-based electrolytic polymer. Water or alcohol can be applied as the dispersive solvent DS.

Manufacturing of the electrode ink is performed by mixing the catalyst supports CS, the ionomers IO, and the dispersive solvent DS at an appropriate ratio, and then, for example, carrying out pulverizing, kneading, and stirring or the like by means of a pulverizing mechanism such as a bead mill, a stirrer, or the like. Consequently, the electrode ink, in which the catalyst supports CS and the ionomers IO are dispersed in the dispersive solvent DS, is prepared. The adjusted (prepared) electrode ink is provided in the form of a paste. Hereinafter, the manufacturing process for adjusting (preparing) such an electrode ink is referred to as a kneading process.

Further, in manufacturing the electrodes of the fuel cell, during transportation of a substrate material (a polymer paste, an electrolyte membrane, etc.), the electrode ink that was prepared by the kneading process is coated on the substrate material by a die head or the like so as to be formed with a constant thickness. Consequently, the catalyst layer for the electrodes (the anode electrodes, the cathode electrodes) of the fuel cell is created. Hereinafter, the manufacturing process for creating the catalyst layer will be referred to as a coating process.

In order to measure the state of the above-mentioned electrode ink, the measurement system 10 is equipped with a rheometer 12 capable of measuring both the elastic modulus and the viscosity (dynamic viscoelasticity) of the electrode ink, and a computer 34 processing the measurement results of the rheometer 12. As the rheometer 12 according to this embodiment, a rotary rheometer capable of providing an appropriate shearing force to a sample of the electrode ink is used. The detection method of the rheometer 12 is not particularly limited as long as it can detect the elastic modulus of the electrode ink with high accuracy; for example, a vibration method or the like may be applied.

Specifically, the rheometer 12 has a cup 14 into which a sample of electrode ink is poured, a rotary body 16 that is inserted into the cup 14, a mechanism unit 18 for operating the rotary body 16, and a detection unit 20 for detecting the viscoelasticity of the electrode ink when the rotary body 16 is rotated in the cup 14. Inside a housing 22 of the rheometer 12, there is provided a control unit 24 that controls the operation of the mechanism unit 18 and calculates the viscoelasticity from the parameters detected by the detection unit 20. In addition to the above configuration, the rheometer 12 may be provided with a temperature adjustment mechanism or the like for adjusting the temperature of the electrode ink contained in the cup 14.

Figure 2:
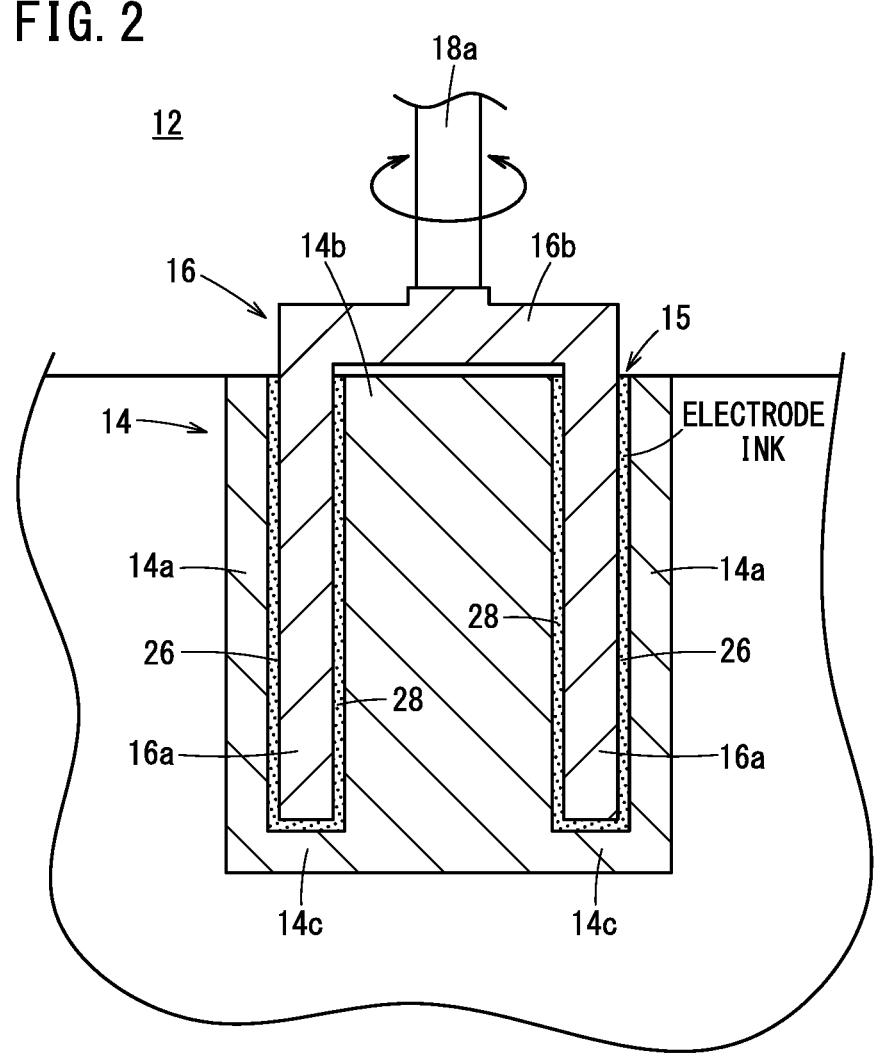
FIG. 2 is a side cross-sectional view showing a cup and a rotary body of a double gap construction.

In this embodiment, the cup 14 and the rotary body 16 adopt a double gap structure as shown in FIG. 2. In this case, the cup 14 is formed in a bottomed cylindrical shape in which a cylindrical outer peripheral wall portion 14a and a cylindrical central convex portion 14b provided at the inner center of the outer peripheral wall portion 14a are connected by a bottom wall 14c. That is, the cup 14 has a concave space 15 surrounded by the outer peripheral wall portion 14a, the central convex portion 14b, and the bottom wall 14c, and the electrode ink is injected into this concave space 15.

The rotary body 16 has a cylindrical cell wall 16a that can be inserted into the concave space 15, and a ceiling wall 16b that covers the upper end of the cell wall 16a. A shaft portion 18a of the mechanism unit 18 is connected to the central portion of the ceiling wall 16b. The cell wall 16a maintains non-contact with the outer peripheral wall portion 14a and the central convex portion 14b in a state of being inserted into the concave space 15.

The aforementioned cup 14 and the rotary body 16 form a first gap 26 between the outer peripheral wall portion 14a of the cup 14 and the cell wall 16a and a second gap 28 between the central convex portion 14b of the cup 14 and the cell wall 16a at the time of measurement. This causes the rotary body 16 to contact the sample at both the first gap 26 and the second gap 28, thereby receiving a large torque from the sample. As a result, rheometer 12 can measure slight differences in the viscoelasticity of electrode inks at high resolution.

Returning to FIG. 1, the mechanism unit 18 supports, with the shaft portion 18a, the rotary body 16 in a suspended state, moves the rotary body 16 in the up-down direction, and rotates the shaft portion 18a in clockwise and counterclockwise directions. For example, the mechanism unit 18 is made up from a bearing that supports the shaft portion 18a, a motor that rotates the shaft portion 18a, an encoder that detects the rotational position and the number of rotations of the rotary body 16, an actuator that moves the rotary body 16 up and down, and the like (not shown). The mechanism unit 18 periodically and alternately rotates the rotary body 16 clockwise and counterclockwise to apply, via the rotary body 16, appropriate torque to the electrode ink housed in the first gap 26 and the second gap 28.

The detection unit 20 is provided in each of the housing 22 accommodating the upper end and a portion near the upper end of the shaft portion 18a and the housing 22 accommodating the cup 14. These detection units 20 detect the parameters (amplitude strain, amplitude stress, phase angle, etc.) applied from the electrode ink accommodated in the first gap 26 and the second gap 28 during the rotation of the rotary body 16.

The control unit 24 of the rheometer 12 has one or more processors, memory, an input/output interface, and an electronic circuit (not shown). Within the control unit 24, a plurality of functional blocks are formed to control the operation of the rheometer 12 and to process the detection results of the detection units 20 by one or more processors executing programs (not shown) stored in the memory. Moreover, at least a portion of each of the functional blocks may be constituted by an integrated circuit such as an ASIC (Application Specific Integrated Circuit), an FPGA (Field Programmable Gate Array) or the like, or an electronic circuit containing a discrete device. Various types of drives (an HDD, an SSD, or the like) can be applied as the memory, or the memory can include a memory associated with a processor, an integrated circuit, or the like. The input/output interface of the control unit 24 is connected to a monitor 30 for displaying information on the control unit 24 and an operation unit 32 (button, keyboard, mouse, etc.) for operating the control unit 24.

To be more specific, the control unit 24 calculates the modulus G' (shearing modulus) and viscosity G" from the parameters detected by the detection unit 20, and displays the calculated modulus G' and viscosity G" on the monitor 30 or the like. The method of calculating the elastic modulus G' and the viscosity G" from the parameters of the detection unit 20 is not particularly limited, and well-known calculation methods can be adopted.

Further, the control unit 24 may be configured to calculate the loss tangent tan δ of the electrode ink based on the elastic modulus G' and the viscosity G" detected from the electrode ink and display the loss tangent on the monitor 30. The loss tangent tan δ of a fluid can be expressed by the following equation (1):

$$\tan \delta = G''/G' \qquad (1)$$

(G": Viscosity, G': Modulus)

The loss tangent tan δ may be calculated in the computer 34 based on the sensing results (elastic modulus G' and viscosity G") measured by rheometer 12. The computer 34 has one or more processors, memory, an input/output interface, an electronic circuit (not shown) and is connected to a monitor 36 and an operating unit 38 via the input/output interface. The computer 34 may be configured to be communicatively connected to the rheometer 12 and to automatically obtain the loss tangent tan δ (or elastic modulus G').

Here, the loss tangent tan δ (or elastic modulus G') of the electrode ink serves as an index indicating the degree of elasticity and viscosity properties of the electrode ink. This loss tangent tan δ changes depending on the state of a primary aggregate 40 and a secondary aggregate 42 within the electrode ink (refer to FIG. 3A and FIG. 3C). Therefore, based on the loss tangent tan δ, the computer 34 can approximately estimate the state of the primary aggregate 40 and secondary aggregate 42 within the electrode ink.

Next, a description will be given specifically concerning the primary aggregate 40 and the secondary aggregate 42 that are formed in the electrode ink, and a description will be given in detail concerning a principle for estimating the state of the primary aggregate 40 and the secondary aggregate 42 (a principle of determining a good quality of the electrode ink).

Among the electrode materials that make up the electrode ink, the catalyst supports CS are a hydrophobic material, and the catalyst supports CS alone cannot be uniformly dispersed within the dispersive solvent DS. On the other hand, in the case that the ionomers IO are uniformly present in the dispersive solvent DS, as shown in FIG. 3A, the ionomers IO can be adsorbed with respect to almost all of the catalyst supports CS, and further, the ionomers IO are capable of uniformly and thoroughly covering the surface of the catalyst supports CS. Consequently, the primary aggregate 40 is formed around the catalyst supports CS with the ionomers IO acting as a three dimensional barrier, and the primary aggregate 40 itself becomes placed in a state of being mutually dispersed within the dispersive solvent DS.

That is, particles of the primary aggregate 40 within the dispersive solvent DS are mutually dispersed because of the adsorption of the ionomers IO around them. Therefore, as shown with hatched arrows in FIG. 3A, particles of the primary aggregate 40 are slippery to each other (high degree of slipperiness), and it can be said that the electrode ink containing a large amount of the primary aggregate 40 has a property of easily deforming.

In addition, as shown in FIG. 3B, in a state in which the electrode ink having a large amount of the primary aggregate 40 is coated on a substrate material 44 by means of a coating process, the ionomers IO which have been absorbed on the primary aggregate 40 exist uniformly on the coated surface. Therefore, the dried catalyst layer is capable of forming a layer having a substantially constant thickness without the occurrence of any defects (cracks or the like) on the dry coated surface.

In contrast thereto, as shown in FIG. 3C, in the case that the ionomers IO are non-uniformly present in the dispersive solvent DS, the ionomers IO which are absorbed around the catalyst supports CS become the primary aggregate 40, while on the other hand, by the catalyst supports CS themselves being aggregated or clumped together at locations where the ionomers IO are not absorbed, the secondary aggregate 42 is formed. The secondary aggregate 42 becomes of a higher density than the primary aggregate 40 due to the aggregation of the catalyst supports CS themselves.

The catalyst supports CS constituting the secondary aggregate 42 are kept in contact with each other because of the lack of the ionomers IO therebetween. Therefore, as shown with hatched arrows in FIG. 3C, it can be said that the catalyst supports CS of the secondary aggregate 42 are less slippery to each other (low degree of slipperiness), and the electrode ink containing a large amount of the secondary aggregate 42 has a property of being resistant to deformation.

Further, the electrode ink having a large amount of the secondary aggregate 42, as shown in FIG. 3D, in the case of being coated on the substrate material 44, forms locations in which the ionomers IO are insufficient due to the presence of the secondary aggregate 42. For this reason, in the dried catalyst layer, defects such as cracks on the dry coated surface are generated, thereby forming unevenness (a non-constant thickness), and lowering the product quality of the electrodes.

In other words, the electrode ink having a large amount of the primary aggregate 40 relative to the secondary aggregate 42 (almost none of the secondary aggregate 42 is present) becomes a good quality product. Conversely, the electrode ink having a small amount of the primary aggregate 40 relative to the secondary aggregate 42 becomes a bad quality product. However, in the state in which the primary aggregate 40 is few in amount relative to the secondary aggregate 42, there is included a state in which the amount of the primary aggregate 40 is greater than the amount of the secondary aggregate 42.

In the method of determining a good quality of the electrode ink according to the present embodiment, the loss tangent tan δ (or elastic modulus G') of the electrode ink is used as an index correlated with the amount of the primary aggregate 40 and the amount of the secondary aggregate 42. That is, as in the above equation (1), the loss tangent tan δ (or elastic modulus G') of the electrode ink changes because of the influence of the slippery nature of the primary aggregate 40 and the non-slippery nature of the secondary aggregate 42.

Figure 4A:
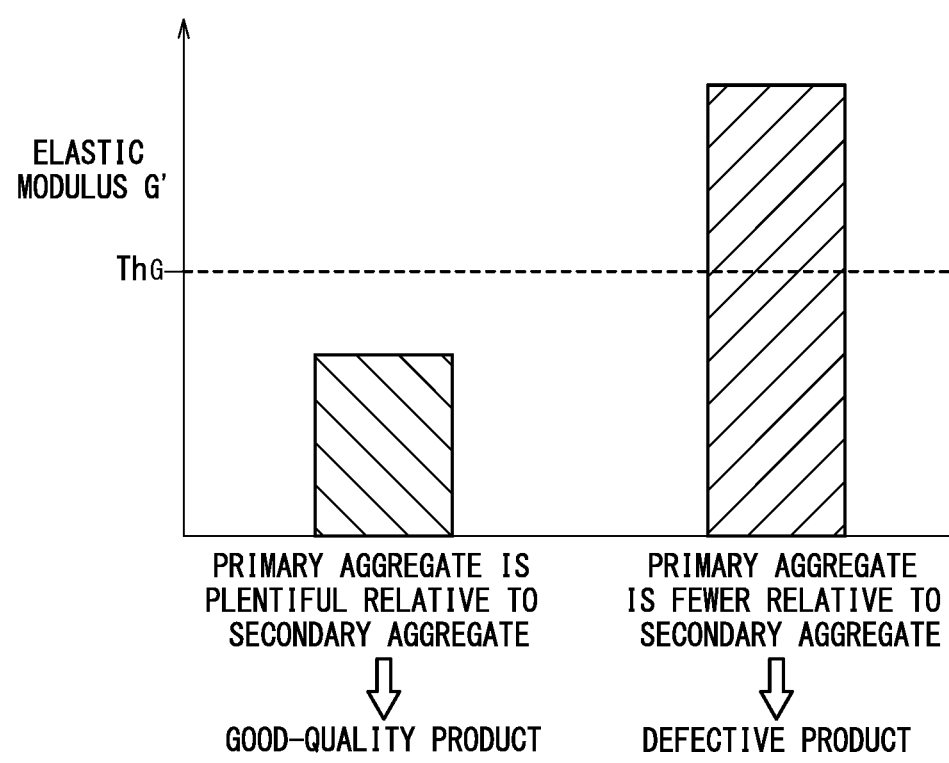
FIG. 4A is a graph showing a comparison between an elastic modulus of the electrode ink and a change threshold value.

The elastic modulus G' of the electrode ink becomes small as shown in FIG. 4A because the electrode ink with a large amount of the primary aggregate 40 easily deforms in which particles of the primary aggregate 40 are slippery to each other. Then, the loss tangent tan δ increases because of the small elastic modulus G' (see FIG. 4B). On the contrary, the elastic modulus G' of the electrode ink becomes larger as shown in FIG. 4A because the electrode ink with a large amount of the secondary aggregate 42 is resistant to deformation in which particles of the primary aggregate 40 are not slippery to each other. Then, the loss tangent tan δ increases because of the larger elastic modulus G' (see FIG. 4B).

That is, in the method of determining a good quality of the electrode ink, on the basis of the index detected by the rheometer 12, which is the loss tangent tan δ (or elastic modulus G') of the electrode ink, the amount of the primary aggregate 40 and the amount of the secondary aggregate 42 can be estimated. In the case that the loss tangent tan δ of the electrode ink is large, the primary aggregate 40 becomes plentiful relative to secondary aggregate 42, and it can be said that the electrode ink is a good quality product. Conversely, in the case that the loss tangent tan δ of the electrode ink is small, the primary aggregate 40 becomes few in amount relative to the secondary aggregate 42, and it can be said that such an electrode ink is a defective product.

Figure 4B:
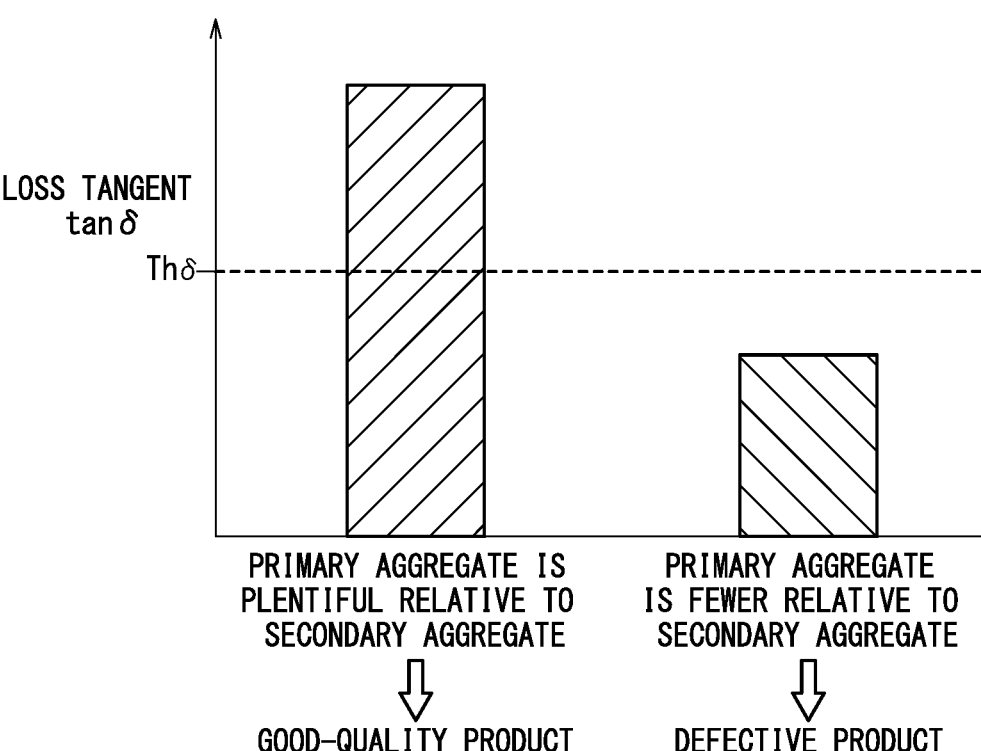
FIG. 4B is a graph showing a comparison between a loss tangent of the electrode ink and a change threshold value.

The computer 34 estimates the state of the primary aggregate 40 and the secondary aggregate 42 within the electrode ink based on the input of the elastic modulus G' and the viscosity G" detected by the rheometer 12. For example, as shown in FIGS. 4A and 4B, the computer 34 has a change threshold Th$_δ$ (or change threshold Th$_G$) corresponding to the loss tangent tan δ (or elastic modulus G') of the electrode ink.

The computer 34 then determines that there are more of the primary aggregate 40 relative to the secondary aggregate 42 if the loss tangent tan δ of the electrode ink is larger than the change threshold Th$_δ$ (or if the elastic modulus G' is smaller than the change threshold Th$_G$). As a result, the computer 34 recognizes the electrode ink as a good-quality product and notifies a user via the monitor 36 that it is a good-quality product. On the other hand, the computer 34 determines that there are less of the primary aggregate 40 relative to the secondary aggregate 42 if the loss tangent tan δ of the electrode ink is smaller than the change threshold Th$_δ$ (or if the elastic modulus G' is larger than the change threshold Th$_G$). Thus, the computer 34 recognizes the electrode ink as a defective product and notifies the user via the monitor 36 that it is a defective product. The measurement system 10 may omit the computer 34 and may determine, in the control unit 24 of the rheometer 12, the quality of the electrode based on the loss tangent tan δ (or the elastic modulus G').

Figure 5:
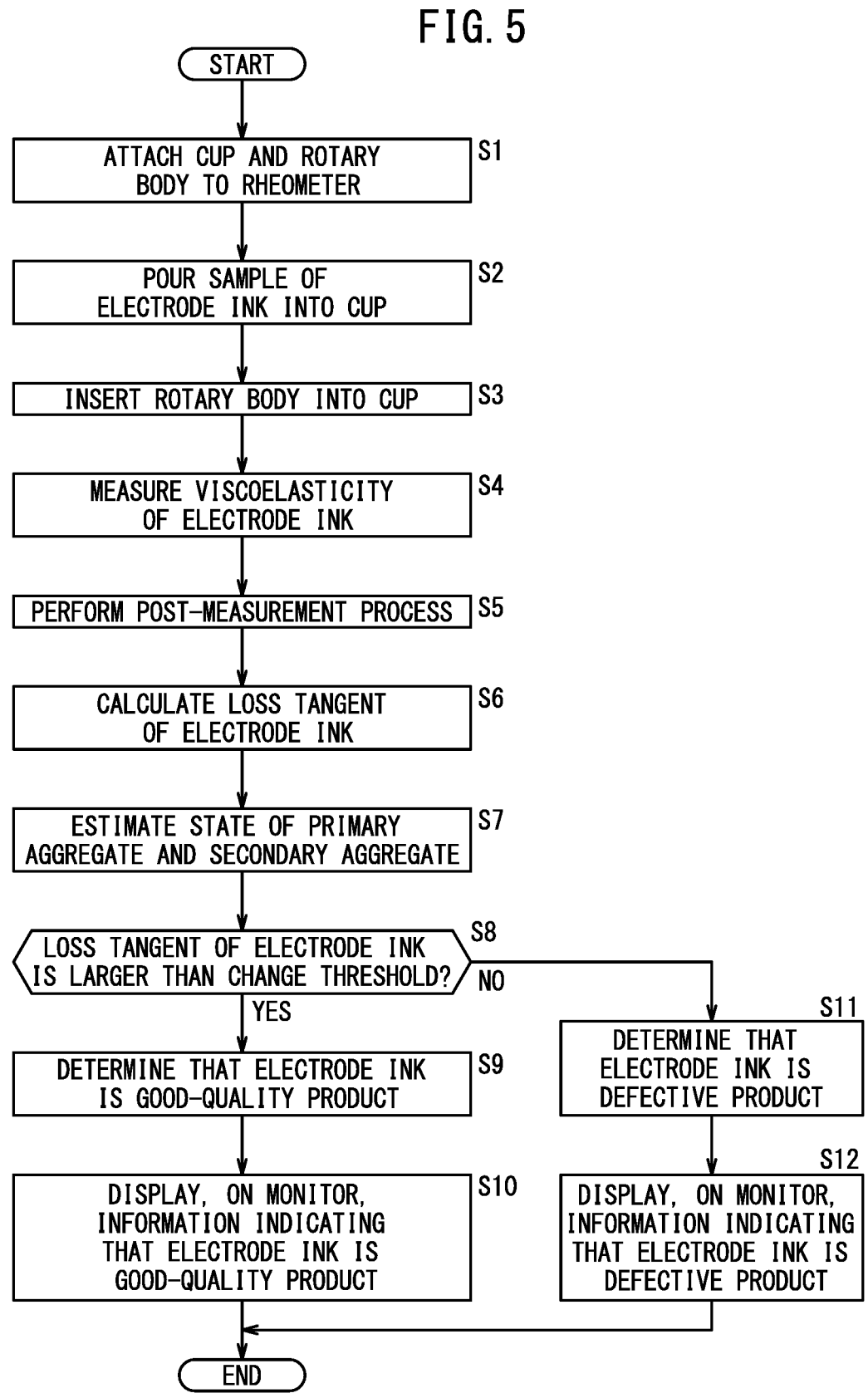
FIG. 5 is a flowchart illustrating the method of determining a good quality of an electrode ink.

The measurement system 10 according to the present embodiment is basically configured in the manner described above. Next, a description will be given with reference to FIG. 5 concerning the method of determining a good quality of the electrode ink. Below, the process flow of calculating the loss tangent tan δ of the electrode ink and determining the quality of the electrode ink based on the loss tangent tan δ will be described.

Specifically, in the method of determining a good quality of the electrode ink, the user attaches the cup 14 and the rotary body 16 of the double-gap structure to the rheometer 12 (step S1). Thereafter, the user pours a sample of electrode ink into the cup 14 (step S2). In accordance with these steps, a preparation process for detecting the loss tangent tan δ of the electrode ink is completed.

When the measurement is started after the preparation step, the control unit 24 of the rheometer 12 controls the mechanism unit 18 to lower the rotary body 16, and inserts the rotary body 16 into the concave space 15 of the cup 14, whereby the electrode ink is sandwiched between the first gap 26 and the second gap 28 (step S3). Then, the control unit 24 measures the viscoelasticity of the electrode ink poured into the cup 14 by rotating the rotary body 16 clockwise and counterclockwise (step S4). That is, the control unit 24 detects the elastic modulus G' and the viscosity G" using the detection unit 20, and stores a detection result of the detection unit 20 in the memory.

When the viscoelasticity measurement is completed, the control unit 24, as a as post-measurement process, stops the rotation of the rotary body 16 using the mechanism unit 18 and also raises the rotary body 16 to separate the rotary body 16 from the cup 14 (step S5). Thereafter, the user discharges the electrode ink from the cup 14, together with carrying out cleaning of the cup 14 and the rotary body 16.

Then, the control unit 24 or the computer 34 calculates the loss tangent tan δ of the electrode ink based on the measured elastic modulus G' and viscosity G" (step S6). Then, the computer 34 estimates the state of the primary aggregate 40 and the secondary aggregate 42 in the electrode ink based on the acquired loss tangent tan δ (step S7). That is, the computer 34 can estimate that there are more of the primary aggregate 40 relative to the secondary aggregate 42 when the loss tangent tan δ is large, and can estimate that there are less of the primary aggregate 40 relative to the secondary aggregate 42 when the loss tangent tan δ is small.

The computer 34 determines whether the electrode ink is a good-quality product or not based on the state of the primary aggregate 40 and the secondary aggregate 42 in the electrode ink (step S8). Specifically, when the loss tangent tan δ of the electrode ink is larger than the change threshold Th$_δ$ (step S8: YES), the control unit 24 estimates that there are more of the primary aggregate 40 relative to the secondary aggregate 42, and determines that the electrode ink is a good-quality product (step S9). As a result, the computer 34 displays on the monitor 36 information indicating that it is a good-quality product (step S10).

Conversely, when the loss tangent tan δ of the electrode ink is smaller than the change threshold Th$_δ$ (step S8: NO), the control unit 24 estimates that there are less of the primary aggregate 40 relative to the secondary aggregate 42, and determines that the electrode ink is not a good-quality product (defective product) (step S11). As a result, the computer 34 displays on the monitor 36 information indicating that it is a defective product (step S12).

By carrying out the process flow in the manner described above, in the method of determining a good quality of the electrode ink, prior to the coating process being implemented, it is possible for the user to recognize whether or not the electrode ink prepared in the kneading process is a good quality product. Consequently, for example, in the case that the electrode ink is defective, the user can take an appropriate countermeasure (preparation again in the kneading process, or disposal or the like). More specifically, in the method of determining a good quality of the electrode ink, it is possible to significantly increase the yield at the time of forming the electrodes of the fuel cell.

The present invention is not limited to the above-described embodiment, and various modifications can be made thereto in accordance with the essence and gist of the invention. For example, in the method of determining a good quality of the electrode ink, it may be determined whether the electrode ink is a good-quality product by comparing the elastic modulus G' with the change threshold Th$_G$ using the detection result of the elastic modulus G' measured by the measurement system 10.

In addition, for example, a method of determining a good quality of the electrode ink may extract a plurality of samples of the electrode ink prepared in the kneading process and detect a plurality of values of the loss tangent tan δ (or elastic modulus G'). Then, the computer 34 may evaluate whether the electrode ink is good or bad based on an average value, a minimum value, a maximum value, etc. of the plurality of values of the loss tangent tan δ (or elastic modulus G').

Technical concepts and advantageous effects which can be grasped from the above-described embodiment will be explained below.

The first aspect of the present invention is characterized by the method of determining a good quality of the electrode ink configured to include the plurality of catalyst supports CS and the plurality of ionomers IO, and configured to form the catalyst layer of the fuel cell, wherein, in the inner portion of the electrode ink, by adsorption of the ionomers IO around the catalyst supports CS, the primary aggregate 40 that does not aggregate with others of the catalyst supports CS is formed, while on the other hand, by aggregation of the catalyst supports CS themselves without the ionomers IO around the catalyst supports CS, the secondary aggregate 42 is formed, the method of determining a good quality of an electrode ink comprising the steps of detecting the elastic modulus G' of the electrode ink, and estimating the state of the primary aggregate 40 and the secondary aggregate 42 within the electrode ink based on the detected elastic modulus G', and as the primary aggregate 40 becomes more plentifully contained within the electrode ink relative to the secondary aggregate 42, the more it is determined that the electrode ink is a good quality product.

In accordance with the foregoing, in the method of determining a good quality of the electrode ink, based on the detected elastic modulus G', it is possible to suitably determine whether the electrode ink is a good product or a defective product. More specifically, it becomes possible to estimate the state of the primary aggregate 40 and the secondary aggregate 42 from the elastic modulus G', and thus prior to coating of the electrode ink, it is possible for the user to grasp that the electrode ink, in which a greater amount of the primary aggregate 40 relative to the secondary aggregate 42 is contained, is a good quality product. Consequently, the occurrence of defects on the dried surface after the electrode ink has been coated thereon is suppressed, and in manufacturing of the fuel cells, the yield is increased.

In addition, the method of determining a good quality of the electrode ink detects the viscosity G" of the electrode ink along with the elastic modulus G', calculates the loss tangent tan δ using the detected elastic modulus G' and viscosity G", and estimates the state of the primary aggregate 40 and the secondary aggregate 42 within the electrode ink based on the calculated loss tangent tan δ. Thus, in the method of determining a good quality of the electrode ink, based on the loss tangent tan δ obtained through the measurement of the viscoelasticity, it is possible to more accurately estimate the state of the primary aggregate 40 and the secondary aggregate 42 within the electrode ink.

In addition, the method of determining a good quality of the electrode ink detects the elastic modulus G' and the viscosity G" with the rotary rheometer 12. Thus, the method of determining a good quality of the electrode ink can easily obtain the loss tangent tan δ.

The invention claimed is:

1. A method of determining a good quality of an electrode ink configured to include a plurality of catalyst supports and a plurality of ionomers, and configured to form a catalyst layer of a fuel cell, wherein, in an inner portion of the electrode ink, by adsorption of the ionomers around the catalyst supports, primary aggregate that does not aggregate with others of the catalyst supports is formed, while on the other hand, by aggregation of the catalyst supports themselves without the ionomers around the catalyst supports, secondary aggregate is formed, the method of determining the good quality of the electrode ink comprising:

detecting elastic modulus of the electrode ink;

estimating a state of the primary aggregate and the secondary aggregate within the electrode ink based on the detected elastic modulus; and as the primary aggregate becomes more plentifully contained relative to the secondary aggregate, the more it is determined that the electrode ink is a good-quality product.

2. The method according to claim 1, further comprising:

detecting viscosity of the electrode ink along with the elastic modulus;

calculating loss tangent using the detected elastic modulus and viscosity, and estimating the state of the primary aggregate and the secondary aggregate within the electrode ink based on the calculated loss tangent.

3. The method according to claim 2, further comprising detecting the elastic modulus and the viscosity with a rotary rheometer.

\* \* \* \* \*